Oct. 26, 1965  E. A. MARKS  3,214,136
ELEVATING MECHANISM FOR TRAILERS
Filed Oct. 1, 1963  2 Sheets-Sheet 2
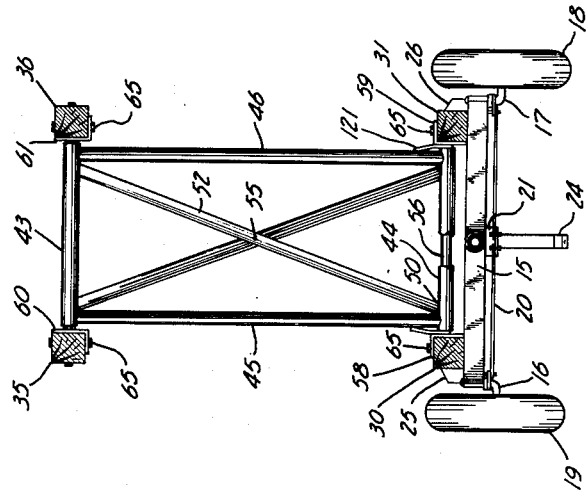
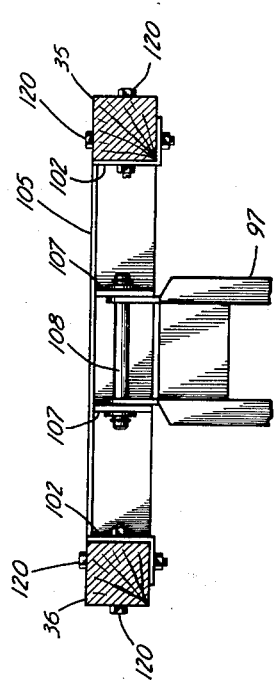
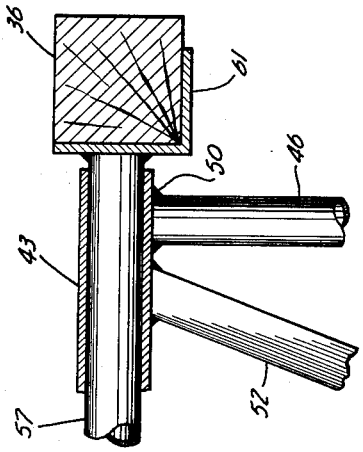
INVENTOR.
ELDON A. MARKS
BY
Schroeder & Siegfried
ATTORNEYS

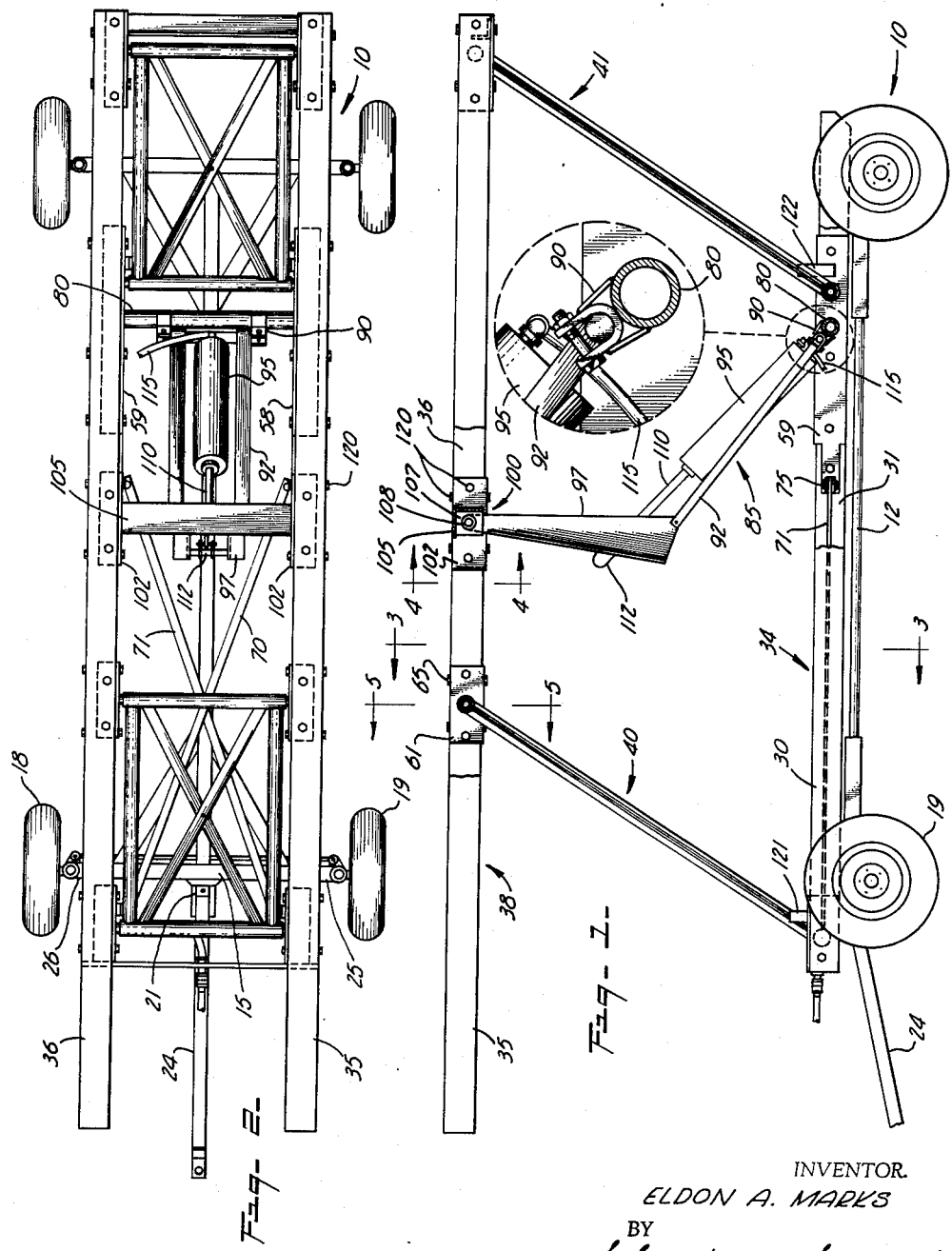

United States Patent Office 3,214,136
Patented Oct. 26, 1965

3,214,136
ELEVATING MECHANISM FOR TRAILERS
Eldon A. Marks, Amboy, Minn.
Filed Oct. 1, 1963, Ser. No. 313,010
3 Claims. (Cl. 254—10)

My invention relates to an improved elevating mechanism which has application in farm type trailer and rack equipment for elevating the same.

The improved elevating mechanism or elevating trailer and rack of the subject invention is used to lift and carry bulky cargo, such as baled hay or straw, shavings, vegetables, fruit, livestock, and poultry, as distinguished from heavy loads, with the purpose of saving time and labor in the stacking, storing, and general handling of such cargo. The invention herein relates to the simplified, balanced, and economical design of the elevating mechanism to adapt it to conventional trailer and rack equipment. The improved elevating mechanism design for an elevating trailer places all of the load bearing forces on the motive device or hydraulic jack, which is very simply attached to the parts of the elevating trailer, such as a base frame and a platform frame. The mounting structure of the improved elevating mechanism includes guides which causes the trailer parts to move in an arcuate path and in a parallel relationship to one another to maintain a load and the load supporting part or platform in a balanced position on the base part at all times. Further, the guides are so mounted on the trailer parts as to provide overhang of the elevated part over the base part at the normal towing connection end of the trailer to permit ready access to the elevated part of the trailer from a towing device in the elevated position, simplifying the use of the same. The improved elevating trailer has use also as a wheeled scaffolding and in other applications where height is desired.

It is therefore an object of this invention to provide an improved elevating trailer, Another object of this invention is to provide in an improved elevating trailer a simplified, rigid, and economical elevating mechanism, A further object of this invention is to provide an improved elevating trailer that is economical to manufacture and durable in use.

These and other objects of this invention will become apparent from a reading of the attached description together with the drawings wherein:

FIGURE 1 is a side elevation view of the improved elevating trailer in an elevated position with parts in section, FIGURE 2 is a plan view of the improved elevating trailer of FIGURE 1, FIGURE 3 is a sectional view of the improved elevating trailer taken along the line 3—3 of FIGURE 1, FIGURE 4 is a broken section view of the improved elevating trailer taken along the line 4—4 of FIGURE 1, and FIGURE 5 is a broken sectional view of the improved elevating trailer taken along the line 5—5 of FIGURE 1.

My improved elevating mechanism for trailers is shown in the drawings as applied to a conventional trailer chassis. It will be understood, however, that it is equally applicable to any combination of wheel and axle parts suitable for combination as a conventional trailer, wagon, or rack, or it may be applied to any fixed bed structure in which the elevating aspect alone is desired. This improved elevating mechanism may be readily applied by the individual farm owner or operator to existing equipment for the purpose of converting it to an elevating type device. Thus, the improved elevating mechanism may be readily connected to conventional trailer parts without requiring special tools, jigs, or manufacturing operations. It therefore greatly reduces the cost of the completed elevating equipment making it readily available, from a cost standpoint, for the individual operator. The simplicity of the design and ease with which it may be adapted to or assembled on existing equipment further makes it readily accessible for the farm operator.

Thus, as will be seen in FIGURES 1 and 2, the improved elevating mechanism is shown applied to a conventional trailer chassis. This chassis includes a conventional rear wheel frame and axle combination mounting a pair of rear wheels 10 which unit is integral with and connected through a tie bar member 12 to a front wheel support member 15 having axle members 16 and 17 pivotally mounted thereon with wheels 18 and 19 mounted on axle parts 16 and 17. A conventional tie bar assembly 20 is connected through a pivot structure 21 to a towing bar or tongue 24 for the trailer. The front wheel support member 15 includes guide flanges 25, 26 which are normally adapted to support a wagon or trailer frame. Similar flanges appear in the rear wheel axle assembly. Upon this conventional frame, or the equivalent thereof, is mounted the various parts of the improved elevating mechanism, as will be hereinafter described. The improved elevating mechanism, which is to be applied to this conventional trailer chassis, includes a pair of elongated base frame members 30 and 31 which may take the form of wood timbers or the equivalent of the same in a metal construction. These members are elongated in form and are adapted to be tied together and to the chassis to form a base frame member 34 integral with or mounted on and securely secured to the chassis parts. This base frame member 34 or the parts making up the same will be so positioned on the chassis as to overhang the wheels thereon.

The base frame members have resting thereon in the unelevated position, similar elongated frame members 35, 36 which are longer than and similarly shaped to the frame members 30, 31 making up the base frame. In the unelevated position, these frame members are disposed on top of and aligned with the frame members 30, 31 with the extremities of the same adjacent the towing end of the chassis being aligned with the extremities of the base frame members 30, 31. The frame members 35, 36 constitute the support or base for a platform frame 38 which is adapted to have mounted on the same and secured thereto a platform or rack (not shown) for the wagon or trailer vehicle. The members 35, 36 may be constructed of any suitable material, such as wood timbers or suitable fabricated metal parts.

The platform frame members 35, 36 and similarly the base frame members 30, 31 will normally not be assembled on the chassis and platform respectively until they have connected thereto cooperating guide structures or means indicated generally at 40 and 41. The guide means 40 and 41 are pivotally mounted on the platform frame and base frame, as will be hereinafter identified.

Each of the guide structures 40, 41 are identical in form and, as will be seen in FIGURE 2, are generally rectangular in form. They are comprised of pivot members 43, 44 at the ends thereof which are made of a metal tubular material such as pipe and have connected therebetween, similar pipe members 45, 46 forming the sides of the guide structures. The side members or pipes are suitably connected between the tubular end members 43, 44 such as by welding, as indicated at 50, to provide the rectangular form. Similarly, torsional support members in the form of rod or flange type metal connecting members 52 extend between the tubular members 43, 44, and are also similarly connected thereto such as by welding. Where the torsion members are flat, they will be normally connected by a bolt or rivet such as is indicated at 55. While cross torsional members are shown herein, similar torsional support members may extend between the respective tubular members without crossing. These guide structures are supported by cylindrical rods shown at 56, 57 in FIGURES 3 and 5, which fit within and journal the tubular end members 43, 44 of the guide structure. The respective rods have connected thereto angle plate members 58, 59, and 60, 61 respectively for the pivotal shafts 56, 57 which fit within and journal the tubular members or end members 43, 44 in each of the guide structures. The tubular pivots 56, 57 are connected to the respective flanges 58, 59, 60, and 61 through suitable means such as welding which assembly will normally take place after they have been inserted in and are connected to the tubular end members 43, 44 of the guide structure which they are to support. Each of the guide structures 40, 41 are identical in form and are normally assembled on the elongated members 30, 31 of the base frame and 35, 36 of the platform frame after the flanges 58, 59, 60, and 61 respectively have been secured to the rod-like supporting members 56, 57.

Thus, the flanges 58, 59 with the rod-like pivot shaft 56 connected thereto are connected to the elongated base frame members 30, 31 when the tubular end portion 43 of the guide structure 40 is mounted thereon. The flanges are suitably attached to the elongated members 30, 31 through suitable bolt means indicated at 65, which extend through bores or apertures in the flanges 58, 59 and in the members 30, 31 being secured thereon through nuts (not shown). As will be noted in FIGURE 3, the spacing between the elongated members of the base frame 30, 31, when the guide structure is included on the pivoting structure or rod 56 is such as to space the members 30, 31 against the guide supports on the chassis 25, 26. The length of the pivotal rod forming the pivoting support is slightly longer than the length of the tubular pivot end member 43 of the guide structure to allow for clearance between the tubular member 43 and the flanges 58, 59. Thus, the guide structure will be freely rotatable at this point. A similar connection is provided between the platform frame members 35, 36 and the flanges 60, 61 supporting the pivot rod 57 of the pivot structure which mounts the tubular end member 43 of the guide structure. The flanges, as in the case of a base frame, are suitably secured to the elongated platform members 35, 36 through bolts extending through holes in the flanges and the elongated members and secured by nuts.

The locus or point of connection of these respective guide structures 40, 41 between the platform frame and base frame formed by the members 30, 31 and 35, 36, will best be seen in FIGURES 1 and 2.

The guide structure 40 through the location of flanges 58, 59 is connected to the base frame for the membrs 30, 31 near the forward or tow bar extremity of the same and to the platform frame or the members 35, 36 through the location of flanges 60, 61 at a point along the extent of the members 35, 36 removed from the end. Similarly, the guide structure 41 is connected, as will be seen in FIGURES 1 and 2, near the extremity or end of the platform frame members and with the opposite extremity of the guide structure 41 connected to the base frame intermediate the extent of the base frame members 30, 31. These distances will be determined by placing the platform frame members 35, 36 on the base frame members 30, 31 so that the tow bar ends of the same are adjacent and overlie one another. By positioning one extremity of the guide structure 40 on the base frame members 30, 31 and one extremity of the guide structure 41 on the platform frame members in the position heretofore described, the mounting positions of the flanges 58–61 supporting the pivot rods 56, 57 for each guide structure will be determined. It will also be noted that when flanges 58, 59, 60, and 61 of the guide structures 40 and 41 respectively, are connected on the members forming the base and platform frames, a rigid and rectangular construction is obtained for these respective frames with the extremities of the frame members extending beyond the pivot structures which also form cross supports for the frames. Thus, the frame members of the base and platform frames will be connected to the guide structures 40 and 41 through the pivot rod 56, 57 at each end of the respective frames to prevent translational or tipping movement between the respective frames. Similarly, the platform frame as it moves will follow an arcuate path defined by movement of the guide structures and the platform frame will move parallel to the base frame so that any load on the platform frame will be balanced. In the arcuate movement of the platform frame with respect to the base frame, the forward extremity of the platform frame will be raised above and overhang the tow bar end of the platform frame for purposes to be later identified. Further, any load distributed on a platform positioned on the platform frame members will be moved from a position where it may to a degree overhang the trailer toward one in which it will be elevated and moved forward to be balanced over the wheels of the chassis for rigidity and stability purposes.

In addition, as will be seen in the plan view of FIGURE 2, the base frame members also include torsional connecting members 70 and 71 which extend between and are connected to tie brackets 75 of the flanges 58, 59 for both base flange assemblies of the guide structures 40, 41. These torsional support members may be tied at their midpoint (not shown) and will aid in preventing any translational movement of the elongated base members 30, 31.

As will be best seen in FIGURE 2, the base frame members 30, 31 at the rearward end of the base frame and adjacent the guide structure 41 includes an additional cross support member 80 which is connected to or suitably welded between the flange parts or members 58, 59 thereon. As will be seen in the plan view, the flanges 58, 59 differ slightly in length from the similar flanges located at the tow bar end of the base frame to accommodate this mounting. The cross support 80 provides a mounting point for the elevating mechanism 85 of the trailer, as will be hereinafter described.

Thus, as will be best seen in FIGURE 1 in an enlargement of a portion of the elevating mechanism, a flange type shackle 90 pivotally mounts one extremity of a two part frame 92, which carries the cylinder 95 of a hydraulic jack. The frame 92 has pivotally connected thereon a second two part lever member 97, which in turn is connected at its opposite extremity, to the platform frame at a thust support section 100. The thrust section 100 is formed by angle flanges 102 connected to the platform frame members 35, 36 with an angle iron bracket 105 extending therebetween and suitably connected to the flanges 102. The angle iron bracket 105 includes a U shaped flange section 107 with a pivot structure 108 thereon adapted to be connected to and pivot the free extremity of the lever 97. The hydraulic cylinder of the jack 95 has its output shaft 110 connected to a pivoting structure 112 on the lever 97 to provide a jack arrangement of the type shown in the Paskar Patent 2,849,255, dated August 26, 1958, and entitled Hoist Mechanism for Dump Trucks. An air or fluid supply conduit for supplying a motivating fluid to said jack or cylinder is shown at 115, the conduit normally extending from the cylinder along the chassis frame toward the forward end of the chassis for connection to a fluid source and control (not shown). While a particular type of jack mechanism is shown herein, it will be understood that any form of motive means operating in a jack fashion of pivoting two levers to raise the free extremity of one of the levers may be suitable for the elevating mechanism defined herein. Thus, the platform frame formed by the members 35, 36 connected by the pivot rods 57 attached to the flanges 60, 61 for each of the guide structures 40, 41 will move in an arcuate direction with a thrust imparted thereto midway along the extent of the frame members 35, 36 and applied thereto through the flange 105 connected to members 35, 36 as identified above. The flanges 102 are connected to the elongated members 35, 36 through suitable bolt means such as is indicated at 120 to complete the connection between the member 35, 36. Thus, any load mounted on a platform positioned on the platform support members 35, 36 will be balanced by virtue of the guide structures 40, 41 connected thereto and raised as the lever parts 92, 97 of the hydraulic jack are rotated relative to one another. The elevation of the platform will be guided by the guide structures 40, 41 which will prevent any tipping movement and the loads so positioned on the platform frame will be moved parallel to the supporting structure or base frame formed by the members 30, 31 on the chassis of the trailer to insure stability of the same. This movement will be in an arcuate and forward direction shifting the load toward the center of the trailer so as to not unbalance the same.

By movement of the platform frame members forward in the elevating direction toward the tow bar end of the chassis, it will be noted that the operator of the vehicle towing the trailer will have the forward end of the platform moved into proximity with the towing vehicle so as to permit ready access by the operator to the platform to thereby simplify the use and operation of the improved elevating trailer.

As indicated in FIGURES 1 and 2, there are also attached to the base frame members 30, 31 guide flanges 121 and 122 on each of the frame members, which in the forward position, serve to guide and support the guide structures 40, 41 in the lowered position. These members will add additional rigidity to the guide structures in the support of the platform frame and are secured to the flange parts 58, 59 for the forward and rearward ends of the base frame member through suitable means such as bolts extending therethrough.

Thus, the improved elevating mechanism for trailers, racks, and the like provides a simple structure which may be applied to conventional or built-up chassis, scaffolds, supports and the like to obtain a high lift elevating mechanism capable of carrying bulky loads. This simplified structure with the guide structures and pivot structures formed therewith will readily be applied to or mounted on parts of a trailer such as a bed and platform through elongated support members to convert conventional trailer and rack equipment for the elevating mechanism. This simplified structure greatly reduces the overall cost of the elevating unit and may be simply applied by an individual without special jigs, tools, or any manufacturing operation.

In operation, it will be noted that the improved elevating mechanism permits a trailer or rack platform to be moved in the direction of a towing vehicle and enables the driver of the same to step onto the load at the elevated position. The movement of the platform through the guide structures or hinge structure brings rearwardly heavy unbalanced loads into a balanced position adding to the stability of the apparatus. The improved elevating mechanism permits conversion of farm equipment to facilitate stacking, hauling and unloading operations at high or elevated levels. Most of the load on the platform is supported by the hydraulic jack or hoist equipment and the guide structures merely serve as guides to maintain balance of the platform against lateral tipping. The advantage in this apparatus is that it may be economically purchased and readily adapted to existing equipment and is considerably less complicated than equivalent elevating apparatus presently available, the use of which has been prohibited on a wide spread basis because of the cost factor.

While I have shown my improved elevating mechanism for trailers or racks in basically a prefabricated form and with a specific type of pivot structure, it will be recognized that the materials and the shapes of the pivots as well as the supporting members may be changed within the scope of the invention. Therefore, I wish to be limited only by the appended claims.

I claim:

1. An elevating mechanism comprising in combination, a base frame means, a platform frame means normally positioned on said base frame means to rest on the same, a pair of pivoted guide structures connecting the base frame means and platform frame means, one of said pivoted guide structures being connected near one extremity of said base frame means and with the opposite extremity of said pivoted guide structure being connected intermediate the extent of said platform frame means, the other of said pivoted guide structures being connected near one extremity of said platform frame means with its other extremity connected intermediate the extent of said base frame means, said base frame means and said platform frame means having laterally spaced elongated side rails rigidly interconnected by pivotal flange means forming a part of said base frame means and said platform frame means to journal the pivoting extremities of said pivoted guide structures on said platform and base frame means, said pivotal flange means comprising transversely extending cylindrical rods spacing the side rails and provided with flanged extremities having means thereon for adjustable attachment to the side rails along their length, the said pivoting extremities of the pivoted guide structures being hollow to surround and freely pivot about said rods, lifting means for elevating said platform frame means on said base frame means including a motive unit and a first pivoted thrust member pivotally connected to said base frame means intermediate the connection of said pivoted guide structures on said base frame means, said lifting means also including a second pivoted thrust member pivoted on said first thrust member and connected to the free end of said motive unit, means pivotally connecting said platform frame means midway along its extent and between the connections of said pivoted guide structures and said platform frame means to said second pivoted thrust member, and tubing means connected to said motive unit for operating said motive unit in elevating said platform frame means relative to said base frame means through an arcuate movement.

2. An elevating mechanism comprising in combination, a base frame means, a platform frame means normally positioned on said base frame means to rest on the same, a pair of pivoted guide structures connecting the base frame means and platform frame means, said base frame means and said platform frame means having laterally spaced elongated side rails rigidly interconnected by pivot flange means forming a part of said base frame means and said platform frame means to journal the pivoting extremities of said pivoted guide structures on said platform and base frame means, said pivotal flange means comprising transversely extending cylindrical rods spacing the side rails and provided with flanged extremities having means thereon for adjustable attachment to the side rails along their length, the said pivoting extremities of the pivoted guide structures being hollow to surround and freely pivot about said rods, lifting means for elevating said platform frame means on said base frame means including a motive unit and a first pivoted thrust member pivotally connected to said base frame means intermediate the connection of said pivoted guide structures on said base frame means, said lifting means also including a second pivoted thrust member pivoted on said first thrust member and connected to the free ends of said motive unit, means pivotally connecting said platform frame means midway along its extent and between the connections of said pivoted guide structures and said platform frame means to said second pivoted thrust member, and tubing means connected to said motive unit for operating said motive unit in elevating said platform frame means relative to said base frame means through an arcuate movement.

3. An elevating mechanism comprising in combination, a base frame means, a platform frame means normally positioned on said base frame means to rest on the same, a pair of pivoted guide structures connecting the base frame and platform frame means, said base frame means and said platform frame means having laterally spaced elongated side rails rigidly interconnected by pivotal flange means forming a part of said base frame means and said platform frame means to journal the pivoting extremities of said pivoted guide structures on said platform and base frame means, said pivotal flange means comprising transversely extending cylindrical rods spacing the side rails and pivoted with flanged extremities having means thereon for adjustable attachment to the side rails along their length, the said pivoting extremities of the pivoted guide structures being hollow to surround and freely pivot about said rods, means for elevating said platform frame means on said base frame means including a motive unit and lever means pivotally connected between the base frame means and the platform frame means, said motive unit being pivotally connected at one extremity to said base frame means and to the pivoted lever means at the other extremity for elevating the platform frame means upon operation of the motive means relative to the base frame means through an arcuate movement.

References Cited by the Examiner

UNITED STATES PATENTS

| | | |
|---|---|---|
| 738,682 | 9/03 | Heritage. |
| 1,865,712 | 7/32 | Stuebing. |
| 2,438,571 | 3/48 | Maxon. |
| 2,449,863 | 9/48 | Ross. |
| 2,756,963 | 7/56 | Rogers. |
| 2,849,255 | 8/58 | Pasker. |
| 2,899,172 | 8/59 | Cresci. |

FOREIGN PATENTS

| | | |
|---|---|---|
| 201,272 | 12/58 | Austria. |
| 926,089 | 4/55 | Germany. |

WILLIAM FELDMAN, *Primary Examiner.*

DONLEY J. STOCKING, *Examiner.*

UNITED STATES PATENT OFFICE
CERTIFICATE OF CORRECTION

Patent No. 3,214,136                                     October 26, 1965

Eldon A. Marks

It is hereby certified that error appears in the above numbered patent requiring correction and that the said Letters Patent should read as corrected below.

Column 7, line 3, strike out "frame and platform frame means, said base frame means" and insert instead -- frame means and platform frame means, said base frame means --; line 11, strike out "the side rails and pivoted with flanged extremities" and insert instead -- the side rails and provided with flanged extremities --.

Signed and sealed this 31st day of May 1966.

(SEAL)
Attest:

ERNEST W. SWIDER                           EDWARD J. BRENNER
Attesting Officer                               Commissioner of Patents